United States Patent
Zahariev et al.

(10) Patent No.: US 11,851,043 B2
(45) Date of Patent: Dec. 26, 2023

(54) METHOD FOR DETERMINING A START TIME FOR A RECHARGING PROCEDURE FOR A PLUNGER DEVICE OF AN ELECTRONICALLY SLIP-CONTROLLABLE POWER BRAKE SYSTEM, AND ELECTRONICALLY SLIP-CONTROLLABLE POWER BRAKE SYSTEM HAVING A PLUNGER DEVICE

(71) Applicant: Robert Bosch GmbH, Stuttgart (DE)

(72) Inventors: Stefan Zahariev, Ilsfeld (DE); Bertram Foitzik, Ilsfeld (DE); Jens Wagner, Untergruppenbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 383 days.

(21) Appl. No.: 17/267,705

(22) PCT Filed: Jul. 11, 2019

(86) PCT No.: PCT/EP2019/068741
§ 371 (c)(1),
(2) Date: Feb. 10, 2021

(87) PCT Pub. No.: WO2020/043383
PCT Pub. Date: Mar. 5, 2020

(65) Prior Publication Data
US 2021/0316703 A1    Oct. 14, 2021

(30) Foreign Application Priority Data
Aug. 31, 2018 (DE) .......................... 102018214820.1

(51) Int. Cl.
*B60T 8/40* (2006.01)
*B60T 8/172* (2006.01)

(52) U.S. Cl.
CPC ............ *B60T 8/4072* (2013.01); *B60T 8/172* (2013.01); *B60T 2250/03* (2013.01); *B60Y 2400/81* (2013.01)

(58) Field of Classification Search
CPC .... B60T 8/4072; B60T 2250/03; B60T 8/172; B60T 8/176; B60T 13/686; B60T 13/745; B60T 13/662; B60Y 2400/81
See application file for complete search history.

(56) References Cited

U.S. PATENT DOCUMENTS 4,753,491 A * 6/1988 Wupper ................ B60T 8/4233
303/22.1
4,826,255 A * 5/1989 Volz ........................ B60T 8/445
188/358

(Continued)

FOREIGN PATENT DOCUMENTS

CN        103303282 A      9/2013
CN        105270375 A      1/2016

(Continued)

OTHER PUBLICATIONS

French Patent No. FR 2983156 published May 31, 2013 to Foitzik et al.*

(Continued)

*Primary Examiner* — Pamela Rodriguez
(74) *Attorney, Agent, or Firm* — NORTON ROSE FULBRIGHT US LLP; Gerard Messina

(57) ABSTRACT

A method for determining a start time for a recharging procedure for a plunger device of an electronically slip-controllable power brake system, and an electronically slip-controllable power brake system having a plunger device. Plunger devices have a plunger cylinder, a plunger piston, and a plunger working space and are operable by a drive motor. A recharging procedure of the plunger device is required from time to time. The start time for a recharging (Continued)

procedure of the plunger device is ascertained as a function of characteristic values that describe the driving state of a vehicle equipped with the power brake system, and/or the operating state of the plunger device when an actual position of the plunger piston lies within a specifiable working range of the plunger device.

6 Claims, 2 Drawing Sheets

(56) References Cited

U.S. PATENT DOCUMENTS

| | | | |
|---|---|---|---|
| 8,788,172 B2* | 7/2014 | Bohm | B60T 7/042 |
| | | | 701/78 |
| 9,399,452 B2* | 7/2016 | Roll | B60T 8/4072 |
| 10,173,653 B2* | 1/2019 | Biller | B60T 8/172 |
| 10,857,986 B2* | 12/2020 | Kim | B60T 8/172 |
| 2003/0020327 A1* | 1/2003 | Isono | B60T 8/4018 |
| | | | 303/113.4 |
| 2013/0080016 A1* | 3/2013 | Bohn | B60T 8/176 |
| | | | 701/78 |
| 2020/0055497 A1* | 2/2020 | Herve | B60T 8/90 |

FOREIGN PATENT DOCUMENTS

| | | |
|---|---|---|
| DE | 10318401 A1 | 12/2003 |
| DE | 102013205639 A1 | 10/2014 |
| WO | 2011141158 A2 | 11/2011 |
| WO | 2011154275 A1 | 12/2011 |
| WO | 2018046168 A1 | 3/2018 |

OTHER PUBLICATIONS

International Search Report for PCT/EP2019/068741, dated Oct. 8, 2019.

* cited by examiner

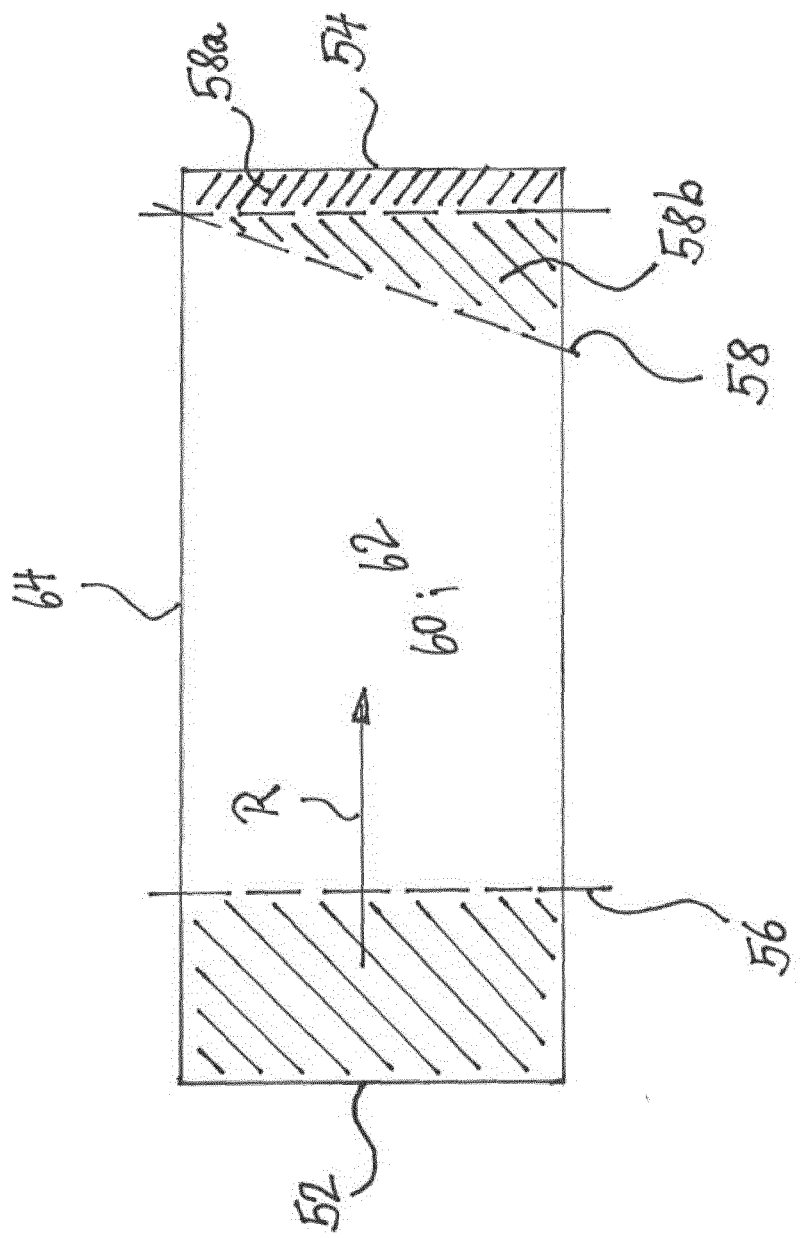

ized by range limits and extends across a selected part of the entire operating range of the plunger device. This not only reduces the number of recharging processes to be undertaken, and thus the loading of the involved components, but it also increases the system availability.

METHOD FOR DETERMINING A START TIME FOR A RECHARGING PROCEDURE FOR A PLUNGER DEVICE OF AN ELECTRONICALLY SLIP-CONTROLLABLE POWER BRAKE SYSTEM, AND ELECTRONICALLY SLIP-CONTROLLABLE POWER BRAKE SYSTEM HAVING A PLUNGER DEVICE

FIELD

The present invention relates to a method for determining a start time for a recharging procedure of a plunger device of an electronically slip-controllable power brake system, and to an electronically slip-controllable power brake system having a plunger device.

BACKGROUND INFORMATION

In electronically slip-controllable power brake systems, the brake pressure in the wheel brakes of a brake circuit is not generated by a driver using muscular energy during a normal operation, but by an electronic actuation of a drive motor of a power pressure generator.

The driver merely enters a possible brake input, for instance by operating a master brake cylinder of the power brake system, which an electronic control unit then sets indirectly via a corresponding actuation of the drive motor of the pressure generator.

As an alternative, a brake input may also be transmitted independently of the driver by the electronic control unit of a power brake system itself, for instance if it was determined based on available sensor information that driving states and/or traffic situations have occurred that require a braking intervention.

With the aid of actuable valve devices of the power brake system, the brake pressure supplied by the pressure generator is able to be adapted, individually for each wheel, to the slip conditions of a wheel of the vehicle allocated to a wheel brake so that an anti-lock braking control (ABS), a drive-slip control (ASR) and/or a driving-stability control (ESP) is/are able to be carried out in the known manner.

It is furthermore conventional to use plunger devices as pressure generators in power brake systems. They have a plunger piston which is movably accommodated in a plunger cylinder and restricts a plunger working space together with the plunger cylinder. Driven by the drive motor, the plunger piston and the plunger cylinder execute a translation movement relative to each other, in response to which the plunger working space changes its volume. With the aid of the plunger device, depending on the direction of this translation movement, a pressure buildup or a pressure dissipation is able to be carried out in a brake circuit of the power brake system contacted with the plunger working space. In the pressure-buildup direction, the plunger device displaces a pressure means from the plunger working space into the brake circuit of the power brake system and the volume of the plunger working space decreases, while this volume successively increases again in the pressure dissipation direction.

The hydraulic circuit diagram of such an electronically slip-controllable power brake system is described in FIG. 1 of German Patent Application No. DE 10 2013 205 639 A1, for example.

This conventional power brake system forms what is called an open system. This means that in a pressure dissipation within the scope of a wheel-individual pressure control, a pressure means drains via a return-flow line to a pressure means reservoir of the power brake system. The drained pressure means is no longer available to the plunger device for subsequent pressure buildups. Multiple braking operations featuring a wheel-individual brake pressure control thus cause the volume of the pressure means to be successively depleted in the plunger working space. It is therefore necessary to operate the plunger device in the pressure dissipation direction from time to time in order to recharge the plunger working space with new pressure means from the pressure means reservoir. For this purpose, the plunger device is able to be briefly cut off from the brake circuit with the aid of additional valve devices of the power brake system. In the cut-off state, an operation of the plunger device in the pressure dissipation direction causes a partial vacuum pressure to form in the plunger working space in relation to the atmospheric pressure of the pressure means reservoir, and the pressure means flows from the pressure means reservoir into the plunger working space.

However, for the duration of such a recharging procedure, the plunger device is not available for a buildup of brake pressure. In order to avoid any significant adverse effect on the vehicle stability, the vehicle deceleration or the braking distance of the vehicle, the recharging procedure must be carried out in a very short period of time.

However, this is disadvantageous insofar as without suitable countermeasures, an instant at which an anti-lock braking control operation, a drive-slip control operation and/or a driving-stability control operation take(s) place can coincide with an instant at which a recharging procedure of the plunger device is necessary. Such a situation may have an adverse effect on the braking distance or the vehicle stability.

SUMMARY

In accordance with example embodiments of the present invention, a method for determining a start time for a recharging procedure of a plunger device of an electronically slip-controllable power brake system, and an electronically slip-controllable power brake system may have the advantage that the start time for a recharging procedure is ascertained as a function of characteristic values that describe a driving state of a vehicle equipped with the power brake system and/or that describe an operating state of the plunger device when an actual position of the plunger piston lies within a specifiable working range of the plunger device. This working range is defined by range limits and extends across a selected part of the entire operating range of the plunger device. This not only reduces the number of recharging processes to be undertaken, and thus the loading of the involved components, but it also increases the system availability.

Additional advantages or advantageous further refinements of the present invention result from the disclosure herein.

Based on the characteristic values that determine the start time of a recharging procedure, an expected driving state of the vehicle is able to be estimated with a relatively good probability. The frequency of instances in which a recharging procedure has to be carried out while a braking operation is taking place is able to be significantly reduced in this way.

For instance, the above-mentioned characteristic values may involve the brake pressure in a brake circuit of a power brake system, the wheel speed of one of the wheels of a vehicle, the longitudinal and transverse acceleration, the yaw rate, and/or the steering angle of the vehicle. Using the sensor devices which are installed in the vehicle as it is, these characteristic values are transmitted to the electronic control unit of the power brake system for a brake-pressure control and allow for a reliable assessment as to whether control interventions in the brake pressure are to be expected in the near future. In the case of potentially pending brake-pressure control interventions, the recharging procedure is able to be shifted to a later point in time offering more suitable marginal conditions.

If information is furthermore considered that describes the operating state of the plunger device such as the rotational speed, the direction of rotation, the current speed, and/or the acceleration of a drive shaft of the drive motor of the pressure generator, then it is advantageously also possible to save the time for a reversal of the direction of rotation of the plunger operation and to minimize the duration of the recharging procedure in this way.

According to an advantageous further refinement of the present invention, the above-mentioned characteristic values are logically linked to one another by the electronic control unit for this purpose. In this context, a logical linkage is understood as a linkage of the characteristic values as a function of their importance, i.e., a weighting or prioritization of the characteristic values, or the use of a fuzzy logic.

With the aid of the provided measures, it is ultimately possible to avoid with a high probability that brake pressure increases are requested at a time when a recharging process is in progress or that an ongoing brake pressure increase has to be interrupted in favor of a recharging procedure. In the final analysis, the provided method or the provided power brake system allows for optimized braking distances while simultaneously ensuring a high driving stability of a motor vehicle equipped with a power brake system.

BRIEF DESCRIPTION OF THE DRAWINGS

Below, the present invention is described in detail with the aid of the figures.

FIG. 2 illustrates the operating range of a plunger device and a working range specified within this operating range, within which the start time for a recharging procedure of the plunger device is able to be specified as a function of characteristic values, in accordance with an example embodiment of the present invention.

DETAILED DESCRIPTION OF EXAMPLE EMBODIMENTS

Figure 1:
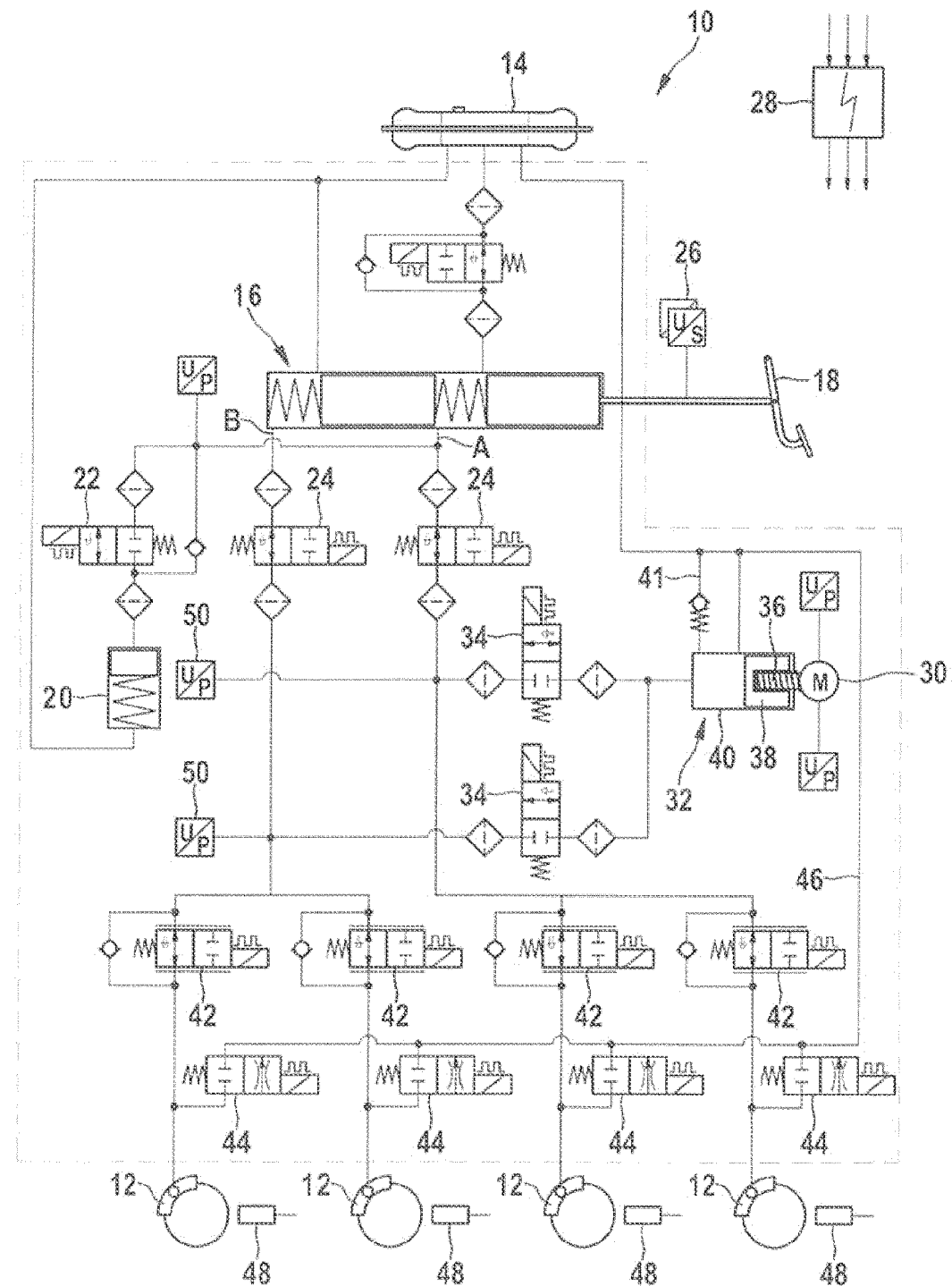
FIG. 1 shows a hydraulic circuit diagram of an electronically slip-controllable power brake system on which the present invention is based. This hydraulic circuit diagram is part of the related art.

FIG. 1 shows the hydraulic circuit diagram of an electronically slip-controllable power brake system on which the present invention is based. Because this hydraulic circuit diagram is already part of the related art, the following description is restricted to the details which may be necessary for understanding the present invention.

The electronically slip-controllable power brake system according to FIG. 1 has been provided with the reference numeral 10. By way of example, for the input of a brake request, it has a master brake cylinder 16 which is operable via a pedal 18. For example, two brake circuits A; B are connected to master brake cylinder 16, which in turn are in contact with two wheel brakes 12 in each case. Master brake cylinder 16, brake circuits A; B, and wheel brakes 12 are supplied with a pressure means via a connected pressure means reservoir 14. A connection of master brake cylinder 16 to brake circuits A; B is controllable with the aid of an actuable first valve device 24; a second actuable valve device 42; 44 is allocated to wheel brakes 12 and allows for an individual control of the brake pressure of each individual wheel brake 12.

A plunger device 32, which is connected in parallel with master brake cylinder 16 to brake circuits A; B, supplies a brake pressure. This plunger device 32 includes a plunger piston 38, which is movably accommodated in a plunger cylinder 40 and restricts a plunger working space together with plunger cylinder 40. Plunger piston 38 is able to be driven by an electronically actuable drive motor 30 via a downstream transmission 36 for the execution of a translation movement in the pressure buildup direction or in the opposite direction in the pressure dissipation direction. The volume of the plunger working space becomes smaller in the pressure buildup direction and increases in the pressure dissipation direction.

A provided third valve device 34 of power brake system 10 allows for the decoupling of this plunger device 32 from brake circuits A; B, should this be required.

Finally, power brake system 10 is equipped with an electronic control unit 28. This control unit 28 detects signals of provided sensors 12, 26, 50 and controls mentioned valve devices 24; 34 and 42, 44 as well as drive motor 30 of plunger device 32 for an adaptation of the brake pressure to the slip conditions at the wheels of the vehicle in accordance with the respective requirements. Braking operations may be autonomously undertaken by the electronic control unit or they may be carried out by the operation of master brake cylinder 16 as a function of a brake input specified by the driver.

FIG. 1 shows the electronically actuable components in their non-actuated basic position in each case.

FIG. 2 shows the theoretically available operating range 64 of a plunger piston 38 in a plunger device 32. Plunger piston 38, operated by drive motor 30, is able to be moved in a translatory fashion between two constructively defined end stops 52 and 54. A plunger working space 60 of plunger device 32 extends between these end stops 52 and 54. It has its maximum volume when plunger piston 38 is situated at a first, inner end stop 52, and has its minimum volume when plunger piston 38 is situated at the opposite, second or outer end stop 54. For a pressure buildup in a brake circuit (FIG. 1: A; B) connected to plunger device 32, plunger piston 38 moves from left to right according to FIG. 2 and in the process displaces a pressure means from plunger working space 60 into this brake circuit. As the movement of plunger piston 38 continues in the pressure buildup direction, the available (residual) volume in plunger working space 60 therefore decreases in a stepwise manner, that is to say, to a theoretical minimum value of zero when plunger piston 38 has reached the second, outer end stop 54. The movement direction R of plunger piston 38 in the pressure buildup direction is indicated by a drawn directional arrow R.

Two dashed lines indicate two assumed range limits 56, 58 of a definable, non-hatched working range 62 of plunger device 32. The present invention is based on the notion that a recharging procedure of plunger device 32 should be carried out only once plunger piston 38 has assumed an actual position within these range limits 56; 58. To carry out a recharging procedure, plunger device 32 is first decoupled from the connected brake circuit with the aid of provided valve devices of the power brake system, whereupon plunger piston 38 is driven in the pressure dissipation direction, i.e. counter to directional arrow R. A partial vacuum pressure therefore forms in the now once again increasing plunger working space 60, which causes a flow of pressure means from a connected pressure means reservoir (FIG. 1: 14) into plunger working space 60.

Range limits 56 and 58 are provided at a distance from each of the two end stops 52 and 54 of plunger device 32 so that working range 62 situated between these range limits 52; 54 covers only a portion of the illustrated entire operating range of plunger device 32.

Left and right range limits 56 in FIG. 2 extend perpendicular to the movement direction of the piston. If an actual position of plunger piston 38 is located between end stop 52 and this range limit 56, then plunger working space 60 still holds a relatively high residual volume so that an execution of a recharging procedure is able to be dispensed with. Range limit 56 is selected in such a way in this case that a large percentage of braking operations featuring a wheel-individual brake pressure control is able to be fully carried out within a collective load that forms the basis of the vehicle species without necessitating a recharging procedure in the process, or for whose implementation the residual volume of the pressure means situated in plunger working space 60 is adequate.

At the earliest, a recharging procedure of plunger device 32 is therefore considered when plunger piston 38 has reached a position beyond this range limit 56 and is situated between range limits 56 and 58 of working range 62.

In this case, electronic control unit 28 of power brake system 10 utilizes characteristic values that allow for a prediction of the state of the power brake system and/or the driving state of the vehicle equipped with the power brake system, and logically links the characteristic values with one another. The logical linkage ultimately results in an ideal time for the start of a pending recharging procedure. A start time is ideal if the recharging procedure is able to be carried out without interrupting a brake pressure buildup during the wheel-individual brake pressure control and can be concluded in its entirety within the shortest period of time.

The mentioned characteristic values may involve the brake pressure, the wheel speeds of the wheels, the longitudinal and the transverse acceleration, the yaw rate and/or the steering angle of the vehicle. In addition, the speed at which drive motor 30 of plunger device 32 is driven, the acceleration of a drive shaft of drive motor 30, and/or the direction of rotation of this drive shaft, and thus characteristic values that describe the operating state of plunger device 32, are able to be taken into consideration.

Linking a plurality of these characteristic values can be realized by electronic control unit 28 by weighting or prioritizing the characteristic values according to their importance and/or with the aid of a fuzzy logic. In the final result, electronic control unit 28 is thereby able to ascertain a suitable time within working range 62 when a recharging procedure of plunger device 32 is triggered or started. At a start time for a recharging procedure ascertained in this way, this recharging procedure is able to be carried out without having to expect a brake pressure increase in parallel therewith.

Second range limit 58 shown on the right in FIG. 2 indicates a residual volume that remains in plunger working space 60. It is made up of a first residual volume share 58a that is unable to be utilized for plunger device 32, and a second residual volume share 58b, which is required for safety-related reasons so that plunger device 32 is able to increase a brake pressure prevailing in a brake circuit to a blocking pressure level during a possibly occurring recharging procedure.

For control technology-related reasons and due to mechanical tolerances, first residual volume share 58a is not usable in the plunger operation. Second residual volume share 58b has different magnitudes and, for instance, depends on the already prevailing pressure level in a brake circuit. It may amount to nearly zero when the brake pressure level present in the brake circuit is already close to the blocking pressure, and/or it may require a volume that is multiple times greater in comparison therewith, for example when the applied brake pressure is low and the blocking pressure level is to be set correspondingly high due to excellent frictional conditions between the wheel and the road. In order to illustrate this described difference in magnitude, second range limit 58 is drawn in as a ramp that rises from left to right.

If plunger piston 38 has already reached an actual position in the region of residual volume share 58b of the plunger device, then the execution of a recharging procedure is unavoidable even if a brake pressure control is already in progress. In this case, an interruption of this brake pressure control cannot be avoided. However, because of the use of the above-described logic, the number of such (exceptional) events is able to be restricted to an unavoidable minimum.

Modifications or supplementations of the exemplary embodiment that go beyond the description are of course possible without deviating from the core idea of the present invention.

What is claimed is:

1. A method for determining a start time for a recharging procedure of a plunger device of an electronically slip-controllable power brake system, the plunger device having a plunger cylinder, a plunger piston which is movably accommodated in the plunger cylinder, and a plunger working space enclosed between the plunger cylinder and the plunger piston, the plunger device being operable by an actuable drive motor in a pressure buildup direction or in an oppositely directed pressure dissipation direction, and an operating range of the plunger device extending between a first end stop at which the plunger working space has a maximum volume, and a second end stop at which the plunger working space has a minimum value, the method comprising:
    specifying, within the operating range of the plunger device, a working range restricted by a first range limit and a second range limit that is closer to the second end stop than the first range limit; and
    based on the specified working range, ascertaining a start time for an operation of the plunger device for carrying out the recharging procedure as a function of characteristic values that describe a driving state of a vehicle equipped with the power brake system, and/or an operating state of the plunger device, such that the start time occurs when an actual position of the plunger piston of the plunger device lies within the working range;
    wherein the specifying is performed to depend the second range limit on a nearness of a brake pressure present in a brake circuit of the power brake system to a blocking pressure level, such that, at the driving state and/or operating state, the nearer the brake pressure is to the blocking pressure level the closer the second range limit is to the second end stop.

2. The method as recited in claim 1, wherein each of the range limits of the operating range lies at a distance from each of the end stops, the distance amounting to an operating travel of the plunger piston.

3. The method as recited in claim 1, wherein the first range limit of the working range is specified by a volume of the plunger working space at which a plurality of braking operations of a collective load is able to be carried out without requiring a recharging procedure of the plunger device during the braking operations, and a second range limit is specified by a pressure device volume in the plunger working space which is required in order to increase an actual brake pressure prevailing in a brake circuit to a blocking pressure level.

4. The method as recited in claim 1, wherein the characteristic values include the brake pressure in the brake circuit, or a wheel speed of one of a plurality of wheels of a vehicle, or a longitudinal acceleration, or a transverse acceleration, or a yaw rate, or a steering angle of the vehicle, or a speed, or an acceleration, or a direction of rotation of a drive shaft of the drive motor.

5. The method as recited in claim 1, wherein a plurality of characteristic values is taken into account and linked with one another, the linkage of the characteristic values being implemented by weighting or prioritizing the characteristic values according to their importance, and/or using fuzzy logic.

6. An electronically slip-controllable power brake system, comprising:
- a plunger device, the plunger device including a plunger cylinder, a plunger piston which is movably accommodated in the plunger cylinder, and a plunger working space enclosed between the plunger cylinder and the plunger piston, the plunger device being operable by an actuable drive motor in a pressure buildup direction or in an oppositely directed pressure dissipation direction, an operating range of the plunger device extending between a first end stop at which the plunger working space has a maximum volume, and a second end stop at which the plunger working space has a minimum volume; and
- an electronic control unit configured to:
    - specify, within the operating range of the plunger device, a working range restricted by a first range limit and a second range limit that is closer to the second end stop than the first range limit; and
    - based on the specified working range, ascertain a start time for an operation of the plunger device for carrying out the recharging procedure as a function of characteristic values that describe a driving state of a vehicle equipped with the power brake system, and/or an operating state of the plunger device, such that the start time occurs when an actual position of the plunger piston of the plunger device lies within the working range;
    - wherein the specification is performed to depend the second range limit on a nearness of a brake pressure present in a brake circuit of the power brake system to a blocking pressure level, such that, at the driving state and/or operating state, the nearer the brake pressure is to the blocking pressure level the closer the second range limit is to the second end stop.

* * * * *